United States Patent
Holt

(10) Patent No.: US 9,882,930 B2
(45) Date of Patent: Jan. 30, 2018

(54) COMMAND INJECTION PROTECTION FOR JAVA APPLICATIONS

(71) Applicant: Waratek Limited, Dublin (IE)

(72) Inventor: John Matthew Holt, Dublin (IE)

(73) Assignee: Waratek Limited (IE)

( * ) Notice: Subject to any disclaimer, the term of this patent is extended or adjusted under 35 U.S.C. 154(b) by 205 days.

(21) Appl. No.: 14/755,571

(22) Filed: Jun. 30, 2015

(65) Prior Publication Data
US 2016/0006758 A1    Jan. 7, 2016

Related U.S. Application Data

(60) Provisional application No. 62/019,933, filed on Jul. 2, 2014.

(51) Int. Cl.
*H04L 29/06* (2006.01)
*G06F 21/50* (2013.01)
*G06F 21/52* (2013.01)

(52) U.S. Cl.
CPC .......... *H04L 63/1466* (2013.01); *G06F 21/50* (2013.01); *G06F 21/52* (2013.01)

(58) Field of Classification Search
CPC ....... H04L 63/1466; G06F 21/50; G06F 21/52
See application file for complete search history.

(56) References Cited

U.S. PATENT DOCUMENTS

| | | | | |
|---|---|---|---|---|
| 7,870,610 B1 * | 1/2011 | Mitchell | ............. | G06F 12/1441 726/22 |
| 8,893,280 B2 * | 11/2014 | Jung | ....................... | G06F 21/52 726/25 |
| 9,015,668 B1 * | 4/2015 | Michelsen | ................ | G06F 8/70 717/120 |
| 2010/0199024 A1 * | 8/2010 | Jeong | .................. | G06F 12/0246 711/103 |
| 2011/0320481 A1 * | 12/2011 | Huang | ................ | G06F 17/2223 707/769 |
| 2013/0290641 A1 * | 10/2013 | Corrie | ................. | G06F 12/0875 711/133 |
| 2013/0325893 A1 * | 12/2013 | Asay | .................. | G06Q 10/0833 707/769 |
| 2014/0089619 A1 * | 3/2014 | Khanna | ............. | G06F 17/30578 711/166 |
| 2015/0039587 A1 * | 2/2015 | Liu | .................... | G06F 17/30286 707/718 |
| 2015/0074065 A1 * | 3/2015 | Christ | ..................... | G06F 3/067 707/692 |
| 2015/0222705 A1 * | 8/2015 | Stephens | ............... | G06F 3/0611 709/214 |

* cited by examiner

*Primary Examiner* — Harunur Rashid
*Assistant Examiner* — Wayne An
(74) *Attorney, Agent, or Firm* — Design IP

(57) ABSTRACT

A method of enhancing secure operation of a computer is disclosed. The computer receives input data from an untrusted source and also operates an application program which can utilize the input data. The method involves creating a tainted value cache and storing the input data in that cache. In the event that the application program invokes a method which utilizes data from the cache, then that data is intercepted before it is utilized by the application program. The intercepted data is subjected to a data content test. If the intercepted data passes the data content test, then the intercepted data is forwarded to the application program to be utilized thereby. However, if the intercepted data fails the data content test, a security action is implemented.

4 Claims, 4 Drawing Sheets

COMMAND INJECTION PROTECTION FOR JAVA APPLICATIONS

BACKGROUND OF THE INVENTION

The present invention relates to computer programs written in the JAVA language.

It has been estimated that over 80% of web application are vulnerable to cyber attack, and much of the danger arises from a class of application vulnerabilities called command-injection vulnerabilities.

Taint tracking is a prior art technique that aims to mitigate, or alert the potential occurrence of, command injection vulnerabilities, exploits, or attacks. Taint tracking works by labeling untrusted input arriving into an application program from an untrusted source (such as a HTTP request header), and follows that untrusted data as it moves through the application program to watch out should that untrusted data be passed as a parameter to a sensitive or vulnerable method (such as a Structured Query Language (SQL) query to be executed by a database)

Prior art taint tracking consists of three main steps:
(i) The first step is to identify untrusted input at the point that it enters the program and mark that it is untrusted (i.e., tainted). This is called "source identification" or "source tainting."
(ii) The second step is to propagate taint information as subsequent computation occurs, marking as tainted all data that is derived from an untrusted source. For example, if part of the tainted data is used to create a new variable, that variable also becomes tainted and is subsequently tracked as well.
(iii) Finally, all data going into a sensitive data sink (e.g., a database, response output, or file) is checked, using the taint information to identify potential attacks.

Prior art runtime taint tracking techniques can be implemented at several levels, affecting the instrumentation precision, overhead, and level of implementation difficulty. Most prior art taint-tracking techniques for the Java Platform are implemented as either bytecode-level (application) instrumentation, or library-level (runtime environment) instrumentation.

Bytecode-Level Instrumentation

Bytecode-level instrumentation of application code is one technique used to implement command-injection protection for Java applications. This prior art technique operates by instrumenting the bytecode of an application, either statically by modifying the contents of a CLASSFILE or JAR file on a hard disk, or dynamically by modifying the bytecode of the application program classfile as it is loaded into the JVM or executed by the JVM. Regardless of which arrangement is used, this instrumentation technique aims to modify the application code, and optionally the Java API class libraries, by enhancing them with additional functionality, behaviours, or operations that can be used to implement taint-tracking in the JVM.

The disadvantages of the prior art bytecode-level instrumentation techniques, are that instrumenting core Java API classes (like java.lang.Object or java.lang.String) may not be possible, or the act of doing so may introduce instability and bugs into the JVM or Java API class libraries that are operating the application program. As a result, bytecode-level instrumentation techniques for command-injection protection of Java applications have not achieved widespread commercial adoption or use.

Examples of bytecode-level instrumentation techniques are described in the publications "WASP: Protecting web applications using positive tainting and syntax-aware evaluation" by Halfond, Orso, and Manalios (IEEE Transactions on Software Engineering (TSE), 34(1):65-81, 2008), and "Dynamic Taint propagation: Finding vulnerabilities without attacking" by Chess and West (Information Security Technical Report, 13(1):33-39, 2008).

Library-Level Instrumentation

Library-level instrumentation of Java API class libraries is another common command-injection protection technique for Java Applications. Library-level instrumentation works by modifying, such as by rewriting and redeploying, the (standard) Java API class libraries that come bundled with the NM being used to run the application program.

The principal advantage of the library-level technique is that it can potentially achieve a lower performance overhead than bytecode-level techniques. However, the disadvantage is that tweaking with standard libraries often reduces the stability of the JVM, the Java API class libraries, or the application execution, as changing the Java API class libraries violates unstated invariants that the runtime, the application, and/or the JVM expect. As a result, library-level instrumentation techniques for command-injection protection of Java applications have not achieved widespread commercial adoption or use.

One example of the danger and complexity of the library-level technique, is modifying, instrumenting, or otherwise changing the class definition or implementation of java.lang.Object or java.lang.String. Even slight modifications to some of the methods of these, or other of the Java API class library classes, can lead to surprising failures at runtime. There is generally no way to determine this ahead of time, other than testing for compatibility with the different runtimes and its versions, such as the many versions of NM from Oracle, IBM, and other vendors.

Examples of library-level instrumentation techniques are described in the publications "Efficient character-level taint tracking in Java" by Chin and Wagner (Proceedings of the ACM workshop on Secure web services, SWS '09, pages 3-12, 2009). This example implementation of library-level taint tracking works by modifying classes of the Java API class libraries used by the JVM (such as for example java.lang.String), in order to implement their library-level taint-tracking technique.

It would be desirable to improve upon bytecode-level instrumentation arrangements by omitting the second step of taint information propagation. In addition, it would be desirable to improve upon library-level instrumentation arrangements by obviating the requirement to modify the Java API class libraries, or any other part of the JVM that ships with the JVM and that is to run an application. Together, these improvements over the prior art provide significant benefits to Java application administrators and operators who desire a command-injection protection solution for their Java Applications but are either unwilling or unable to permit such a solution to modify either, or both of, the (standard) Java API class libraries that are provided with the JVM, or any other part of the Java Virtual Machine.

In practice then, the reliance on modifying the standard libraries of the prior art approaches, renders these prior art taint-tracking approaches infeasible for the majority of real-world Java applications in production.

The present invention discloses a method for protecting Java applications from command-injection vulnerabilities, exploits, or attacks, which can be applied and operated on unmodified NM software with unmodified Java API class libraries, without requiring the instrumentation or modification of this software or these libraries, by employing a garbage-collected tainted-value-cache which operates in a coordinated manner with a JVM's garbage collector.

The use of the term "Unmodified JVM Software" is to be understood to mean JVM software which is received from a JVM vendor, and is not changed after receipt by instrumentation, transformation, recompilation, or similar means.

The use of the term "Unmodified Java API class library(ies)" is to be understood to mean the Java Application Program Interface (API) class libraries which are provided with the JVM Software, and which are not changed after receipt by instrumentation, transformation agents, or similar means.

The use of the term "Java Virtual Machine (JVM)" and "Java Platform" is to be understood to mean an implementation of the Java Virtual Machine Specification (of any revision), and certified as Java Compatible.

The use of the terms "Application Code" and "Application Program" are to be understood to mean Java bytecode classfiles, provided by an application operator, to be loaded into a JVM to be executed by the JVM.

The use of the term "System Code" is to be understood to mean executable code, such as the bytecode classfiles of the Java API class libraries, or executable machine code of the JVM software, provided with a JVM.

The use of the term "Java EE API class libraries" is to be understood to mean any implementation of the Java Platform Enterprise Edition API Specification, or any revision thereof.

The genesis of the present invention is a desire to overcome the limitations of previous taint tracking approaches, which required instrumentation or modification to the JVM or Java API class libraries. This is preferably achieved by employing a garbage-collected tainted-value-cache that is coordinated with the operation of the JVM's garbage collector.

SUMMARY OF THE INVENTION

In accordance with a first aspect of the present invention there is disclosed a method of enhancing secure operation of a computer which receives input data from an untrusted source, and which operates an application program which can utilize said input data, said method comprising the steps of:
creating a tainted value cache,
storing in said cache said input data,
in the event that said application program invokes a method which utilizes data from said cache, intercepting said data before it is utilized by said application program and subjecting the intercepted data to a data content test,
if said intercepted data passes said data content test, forwarding said intercepted data to said application program for utilization, and
if said intercepted data fails said data of content test, implementing a security action.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENTS

An overview of a general embodiment of the present invention will now be described followed by a detailed description of various steps and alternative embodiments which are able to be implemented to enhance the general arrangement forming the basis of the present invention.

Figure 1:
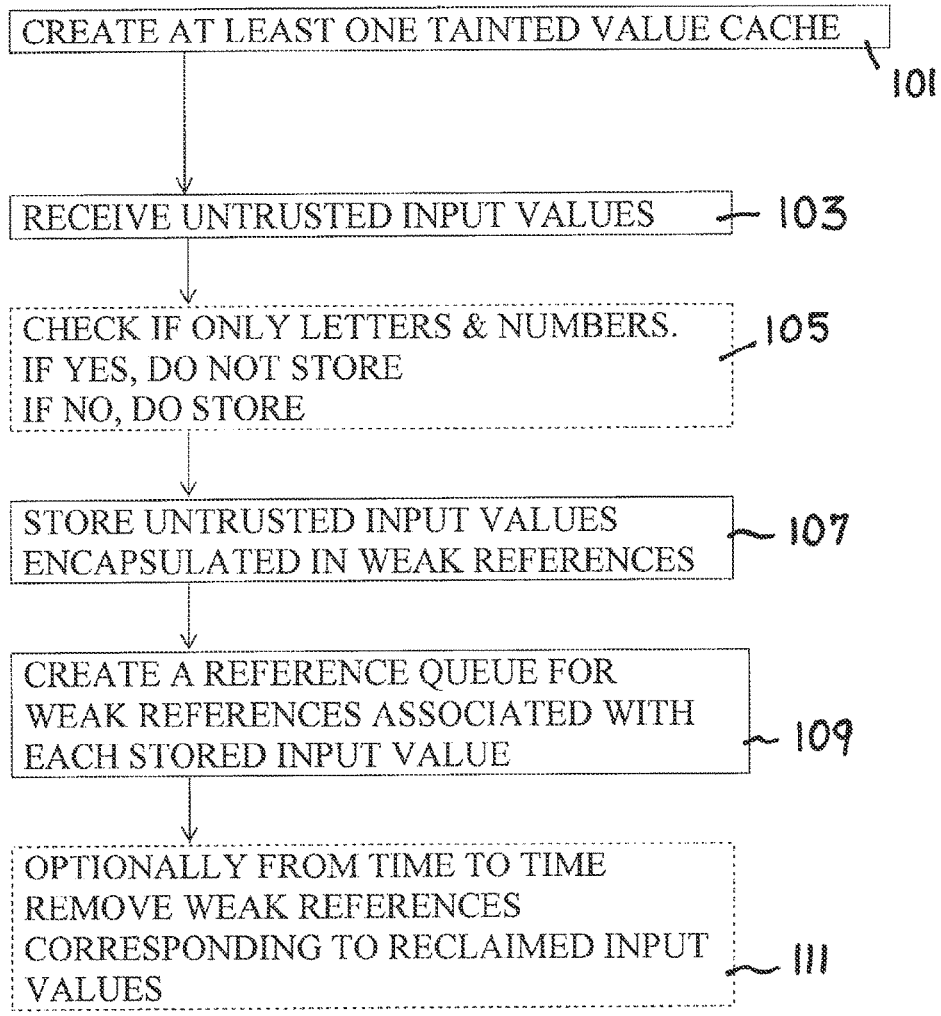
FIG. 1 is a flowchart illustrating an embodiment of the creation of a value cache and the addition of an untrusted input value into said value cache.

As seen in FIG. 1, steps 101 to 111 are able to be taken in order to create a tainted value cache which is a memory into which input values which are untrusted are initially stored. Firstly, as indicated in step 101, at least one cache for tainted values is created and in step 103 untrusted input values are received. These are stored in the tainted value cache as indicated in step 107. Step 105 is an optional step in which input values which consist only of letters and/or numerals can effectively be treated as untainted. This optional step reduces false positives because many input values such as a name or address, are essentially benign. In particular, an input value which contains injected code from a potential hacker or other malicious source will contain characters other than letters and/or numbers and thus such input values will be treated as untrusted.

At step 109, for each stored input value a weak reference is created and placed in a reference queue of such references. This assists in garbage collection to remove input values stored in the cache which are no longer required. This removes from the computer untrusted values at the earliest possible opportunity. Optionally, step 111 is preferably carried out from time to time to remove from the queue those weak references which correspond to input values which have already been reclaimed or deleted.

Figure 2:
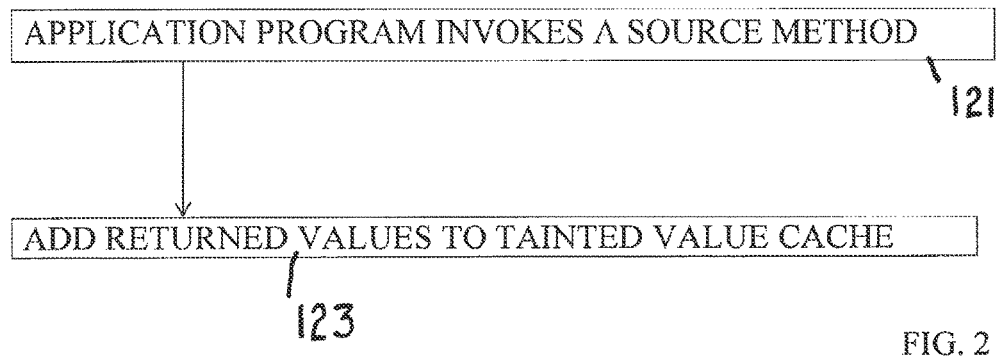
FIG. 2 is a flowchart illustrating one embodiment of a procedure following the invocation of a source method.

Also treated as untrusted values, are returned values created where an application program invokes a source method. As indicated in FIG. 2, where in step 121 an application program invokes a source method, the returned values are added to the tainted value cache as indicated in step 123.

Figure 3:
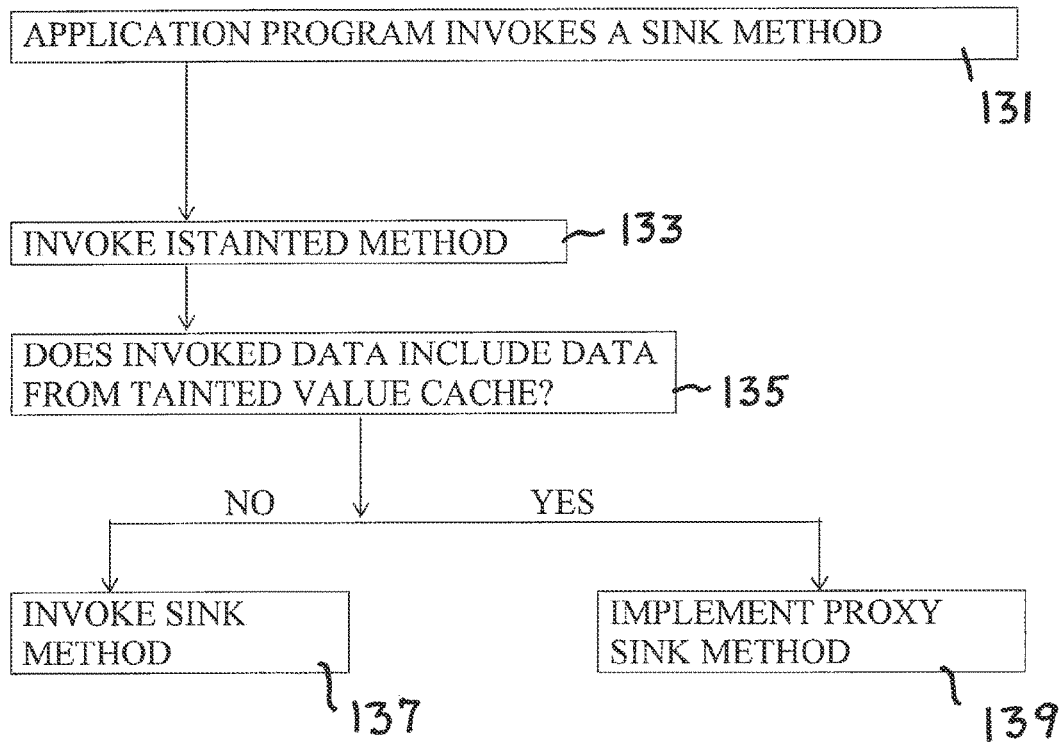
FIG. 3 is a flowchart illustrating one embodiment of a procedure following invocation of a sink method.

The situation where an application program invokes a sink method is indicated in FIG. 3. Rather than allow the sink method to proceed normally, corresponding to the application program's invocation of the sink method as indicated in step 131, the step 133 is undertaken where an "IsTainted Method" is invoked. As indicated in step 135, the data to be passed to the sink method is checked to see whether or not this data includes data from the tainted value cache. If the data does not come from the tainted value cache, then the sink method can be safely invoked as indicated in step 137. However, if the data invoked by the sink method does include data from the tainted value cache, then the sink method is potentially dangerous and a proxy sink, method is invoked instead as indicated in step 139.

Figure 4:
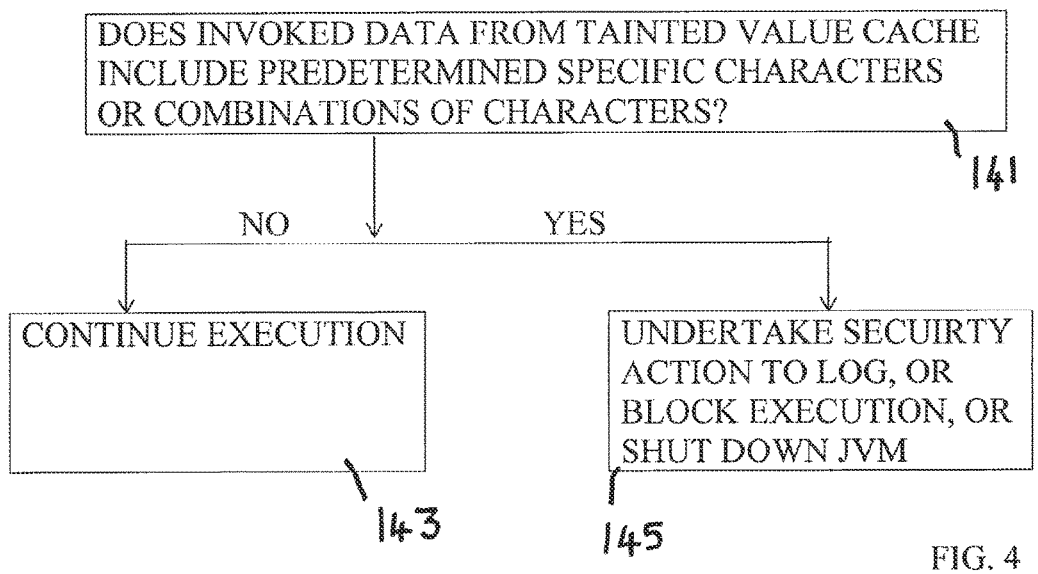
FIG. 4 is a flowchart representing the results of a determination of the character content of data from a tainted value cache.

Turning now to FIG. 4, as indicated in step 141 in carrying out the proxy sink method, the invoked data required for the sink method is examined. If this invoked data is from the tainted value cache and contains various characters which indicate that it is likely to be, for example, a portion of injected code, then as indicated in step 145 a security action is taken. This security action can be to permit the sink method to continue but to merely log the event, or to block the execution of the sink method, or to shut down the entire operation of the JVM. Conversely, if the specific characters indicating the probability of injected code are missing, then as indicated in step 143 the invocation and/or execution of the sink method 137 can take place.

The above-mentioned general scheme enables values input into a computer from an external source to be screened to determine the likelihood that they are tainted. If they are regarded as being untainted, then they can be treated as normal. However, if they are regarded as being tainted then they can be further examined and appropriate action taken. A particular advantage of the arrangement is that the likelihood of false positives is reduced.

With the foregoing general explanation in mind, further details of the various steps, and alternative steps, able to be carried out, are provided hereafter.

Step 1—Tainted Value Cache

In a first step, a Tainted Value Cache is implemented, where Input Values which originate from designated Source Methods (such as those methods which return HTTP request headers to an application program), are stored when they are first read into, or accessed by, the application program.

Each Input Value stored in the Tainted Value Cache is stored encapsulated by a weak reference (of type java.lang.ref.WeakReference), and the weak reference created for a newly added Input Value is optionally added to a reference queue (of type java.lang.ref.ReferenceQueue) associated with the Tainted Value Cache.

When an Input Value is reclaimed (deleted) by the garbage collector of the JVM, the weak reference, which encapsulates the now-reclaimed Input Value, is optionally enqueued on the reference queue associated with that weak reference, if such a reference queue has been associated with the weak reference object.

At the same time, or some time subsequently, a thread can optionally poll the reference queue and retrieve the weak reference of the now-reclaimed Input Value and remove the weak reference entry from the Tainted Value Cache to complete the Tainted. Value Cache garbage-collection cycle.

In some embodiments of this Step 1, a thread provided for this purpose may poll the reference queue periodically. In a further embodiment, some or all of the threads of the application program, as part of the subsequent parameter examination steps, may poll the reference queue periodically.

In an alternative embodiment, the stored entries in the Tainted Value Cache may be periodically enumerated, or enumerated on-demand, where an enumerating thread attempts to retrieve the Input Value encapsulated by each weak reference entry stored in the Tainted Value Cache, and where for each weak reference value which has been cleared (meaning that the Input Value it encapsulates has been reclaimed), removing that weak reference entry from the Tainted Value Cache.

The use of the weak reference types of the JVM in this way, achieves coordinated operation of the Tainted Value Cache with the JVM's garbage collector, ensuring:
  (i) that the Tainted Value Cache does not grow indefinitely, and
  (ii) that an Input Value stored in the Tainted Value Cache is able to be garbage collected by the JVM at such time as the application program no longer references that Input Value.

When a given Input Value is reclaimed by the garbage collector (such as may be the case when a HTTP transaction has completed and the application no longer references the Input Value), the corresponding weak reference entry in the Tainted Value Cache will similarly be removed at the same time or some time later.

When the preferred embodiment of the present invention is implemented in the Java Platform, the Input Values stored in the Tainted Value Cache are preferably of the java.lang.String type. In alternative Java arrangements, different or additional types may also be stored in the same or a different Tainted Value Cache, including java.lang.StringBuffer, java.lang.StringBuilder, java.lang.Boolean, java.lang.Short, java.lang.Float, java.lang.Character, java.lang.Integer, java.lang.Double, java.lang.Byte, java.lang.Long, byte[ ], and char[ ].

In some embodiments of the present invention, more than one Tainted Value Cache may be used, such as one Tainted Value Cache per Input Value type, or such as one Tainted Value Cache per thread or group of threads, or such as one Tainted Value Cache per network transaction or request. Other variations of multiple Tainted Value Caches will now be apparent to those skilled in the computing arts.

In one optimized arrangement of this Step 1, a selection test is applicable to the Input Values to be stored in the Tainted Value Cache, so as to only store Input Values which satisfy some selection criteria. An example of this is a selection criterion which only includes Input Values of type java.lang.String when they include at least one non-letter and non-number character. When using an optimized arrangement such as this, any java.lang.String Input Value which contains only letters (for example "a-z" and "A-Z") or numbers (for example "0-9") may be omitted from storage in the Tainted Value Cache and so decrease the memory capacity required by the Tainted Value Cache.

The reason for this is that benign input values such as a name or address only include such letters or numbers whereas potentially malicious injected code will normally include a range of characters in excess of these letters or numbers.

Various alternative selection criteria or schemes may be used in such optimized arrangements, and the above example is not intended to be definitive or representative of the only possible selection criteria that may be employed. Other selection criteria which can be employed for this optimization, such as different character sequences or constraints other than those described here, will now be apparent to those skilled in the computing arts.

In all of the description herein of Input Values, it is to be understood that the Input Values stored into the Tainted Value Cache can optionally be stored as logical copies of the Input Values (such as a copy of the data of the Input Value that may be made by the java.lang.Object.clone( ) method), instead of a direct object reference of the Input Value object itself.

In all of the description herein of the use of weak references (of type java.lang.ref.WeakReference) to encapsulate Input Values stored in the Tainted Value Cache, it is to be understood that others of the java.lang.ref.Reference types may be similarly employed, mutatis mutandis, in place of the java.lang.ref.WeakReference type described. Examples of other such types include java.lang.ref.Reference, java.lang.ref.PhantomReference, and java.lang.ref.SoftReference.

In embodiments of this invention for the Java Platform, the Tainted Value Cache can take many forms and be implemented as any number of types, including but not limited to the types: java.util.HashSet<WeakReference>, java.util.WeakHashMap, or java.util.LinkedList<Weakreference>.

Unlike prior art approaches, which rely on marking Input Values with taint status flags added to the classfile bytecode of the effected Input Value types (such as java.lang.String), the garbage-collected Tainted Value Cache of the present invention does not require changes to the classfile bytecode of Input Value types. Also unlike prior art approaches which rely on propagating taint status flags of each Input Value as it is used in application operations (such as java.lang.String.concat( ), java.lang.StringBuilder.append( ) etc of Input Values of java.lang.String type), the garbage-collected Tainted Value Cache of the preferred embodiment of the present invention does not incur the memory or performance overhead of intercepting such application operations or propagating taint status flags of Input Values.

Instead, the Tainted Value Cache of the preferred embodiment of the present invention provides a temporary record (cache) of those Input Values that the application has accessed from an untrusted source, so that they can be used when examining the parameters being passed to sensitive or potentially vulnerable operations, method, or functions.

For example, in one embodiment of this invention, the values stored in the Tainted Value Cache can be used to check against parameters being passed to vulnerable or sensitive SQL operations such as the java.sql.Statement.execute(String) method, in order to identify whether these parameters include dangerous Input Values which may represent a SQL command-injection attack.

Step 2—Source Methods

In a second step, one or more Source Method(s) are identified, where the return value(s) of the Source Methods are to be treated as Input Values in accordance with the below description.

Source Methods are methods that are called by application code, the return values of which are designated as Input Values, which can be used by the application code in subsequent actions and operations, the use of which may expose a command-injection vulnerability in the application or runtime system.

In the Java Platform, one example Source Method is the javax.servlet.http.HttpServletRequest.getParameter(String) method (and similar methods of superclasses and subclasses). This getParameter(String) method returns a java.lang.String value (the Input Value) for a named HTTP request parameter, and which may have originated from a HTTP/TCP network connection made by a (potentially) untrusted remote host.

Source Methods thus represent the entry-point for input data or values originating from an untrusted source or from outside of the application (such as a remote network host)—these data or values being designated as Input Values and which therefore may contribute to an attempted attack or security breach on the receiving machine. The danger of the Source Methods, is that the Input Values which they return can be used in confidential or sensitive operations by the application program (such as SQL queries) which, when manipulated by an attacker to contain special characters sequences or other special data values, enables an attacker to insert commands into the runtime execution of the application, databases, or other business logic engines.

In accordance with Step 2, an application program invokes a Source Method, the returned value(s)—or a copy of the returned value(s)—are saved in the Tainted Value Cache so that they may be looked up in a later step. In the description below, the returned value(s) of a Source Method are identified or designated as Input Values, and can be used in the subsequent steps of the preferred embodiment of this invention.

There are several ways in which Input Values can be identified/designated from one or more Source Methods, and such Input Values be stored to the Tainted Value Cache.

In a first embodiment of Step 2, the application source code is modified to invoke an AddToCache Method after invocation of a Source Method, where some or all of the returned Input Values of the Source Methods, or a copy of some or all of the returned Input Values of the Source Methods, are passed to the AddToCache Method as parameters, and where the AddToCache Method stores the Input Values passed to it in the Tainted Value Cache.

This first embodiment of Step 2 is desirable when modification of the application source-code is possible and feasible.

1) In an alternative second embodiment, which does not require modification to application source-code, compiled application code (such as classfile bytecode in the Java Platform) is modified as it is loaded into the JVM, or executed by the to intercept calls to Source Methods by: searching for INVOKE instructions (for example invokestatic, invokevirtual, invokeinterface, invokespecial, invokedynamic) which reference a Source Method which is sought to be intercepted, and
2) for each so-found INVOKE instruction, inserting an extra INVOKE instruction of a AddToCache Method to execute after the so-found INVOKE instruction, where the AddToCache Method is invoked with the Input Values returned from the so-found INVOKE instruction, and
3) where the AddToCache Method stores the Input Values to the Tainted Value Cache.

An example of a bytecode classfile being modified in accordance with this second embodiment is shown below:

```
      BEFORE
   public static void readData(javax.servlet.ServletRequest);
     flags: ACC_PUBLIC, ACC_STATIC
     Code:
       stack=2, locals=2, args_size=1
         0: aload_0
         1: ldc           #2       // String username
         3: invokeinterface #3, 2       // InterfaceMethod
javax/servlet/ServletRequest.getParameter:(Ljava/lang/String;)Ljava/lang/String;
         8: astore_1
         9: aload_1
        10: invokestatic  #4                // Method
com/example/App.doAction:(Ljava/lang/String;)V
        13: return
         LineNumberTable:
           line 10: 0
           line 12: 9
           line 13: 13
      AFTER:
   public static void readData(javax.servlet.ServletRequest);
     flags: ACC_PUBLIC, ACC_STATIC
     Code:
       stack=2, locals=2, args_size=1
         0: aload_0
         1: ldc           #2       // String username
         3: invokeinterface #3, 2       // InterfaceMethod
javax/servlet/ServletRequest.getParameter:(Ljava/lang/String;)Ljava/lang/String;
         8: astore_1
         9: aload_1
        10: invokestatic  #400              // Method
AddToCache:(Ljava/lang/String;)V
        13: aload_1
        14: invokestatic  #4                // Method
com/example/App.doAction:(Ljava/lang/String;)V
        17: return
         LineNumberTable:
```

```
    line 10: 0
    line 11: 9
    line 13: 13
    line 14: 17
```

An example implementation of the AddToCache Method, with an example Tainted Value Cache data structure, is shown below:

```
// This is the Tainted Value Cache
static java.util.HashSet<WeakReference> TaintedValueCache =
    new java.util.HashSet<WeakReference>( );
// Optional reference queue for the Tainted Value Cache
static java.lang.ref.ReferenceQueue
TaintedValueCacheReferenceQueue =
new java.lang.ref.ReferenceQueue( );
// AddToCache Method saves the Input Values to the Tainted
// Value Cache, after first encapsulating the InputValue in
// a WeakReference
public static void AddToCache( String InputValue )
{
    // create the WeakReference to encapsulate the InputValue
    WeakReference encapsulatedInputValue = new WeakReference(
        InputValue, TaintedValueCacheReferenceQueue );
    // add the encapsulatedInputValue to the TaintedValueCache
    TaintedValueCache.add( encapsulatedInputValue );
}
```

In a third embodiment, which also does not require modification to application source-code, compiled application code (such as classfile bytecode in the Java Platform) is modified as it is loaded into the JVM, or executed by the JVM, to intercept calls to Source Methods by:

1) searching for INVOKE instructions (for example, invokestatic, invokevirtual, invokeinterface, invokespecial, invokedynamic) which reference a Source Method which is sought to be intercepted, and
2) for each so-found INVOKE instruction, replace the so-found instruction with a replacement INVOKE instruction that invokes a Proxy Source Method which is provided for the purpose of intercepting and/or emulating access to the Source Method.

A Proxy Source Method is then provided, where the Proxy Source Method receives some or all of the parameters originally intended to be passed to the Source Method and:

1) invokes the same or similar Source Method as was originally intended to be invoked by the application code, with the same or similar parameters that were originally intended to be used by the application in the Source Method invocation, and which have been passed to the Proxy Source Method, and
2) invokes a AddToCache Method, after invocation of the Source Method, with some or all of the Input Values, or a copy of the Input Values, returned by the invocation of the Source Method by the Proxy Source Method, and
3) where the AddToCache Method saves the Input Values to the Tainted Value Cache, and
4) returns to the caller of the Proxy Source Method, the Input Values (or a copy of them) returned from the invocation of the Source Method by the Proxy Source Method.

An example of the third embodiment is shown below, with a before and after of a bytecode classfile modified in accordance with the above steps:

```
            BEFORE:
    public static void readData(javax.servlet.ServletRequest);
        flags: ACC_PUBLIC, ACC_STATIC
        Code:
            stack=2, locals=2, args_size=1
                0: aload_0
                1: ldc            #2                    // String username
                3: invokeinterface #3, 2                // InterfaceMethod
javax/servlet/ServletRequest.getParameter:(Ljava/lang/String;)Ljava/lang/S
tring;
                8: astore_1
                9: aload_1
                10: invokestatic    #4                  // Method
com/example/App.doAction:(Ljava/lang/String;)V
                13: return
            LineNumberTable:
                line 10: 0
                line 12: 9
                line 13: 13
            AFTER:
    public static void readData(javax.servlet.ServletRequest);
        flags: ACC_PUBLIC, ACC_STATIC
        Code:
            stack=2, locals=2, args_size=1
                0: aload_0
                1: ldc            #2                    // String username
                3: invokestatic    #300                 // Method
ProxySourceMethod:(Ljavax/servlet/ServletRequest;Ljava/lang/String;)Ljava/
lang/String;
                6: astore_1
                7: aload_1
                8: invokestatic    #4                   // Method
com/example/App.doAction:(Ljava/lang/String;)V
                11: return
            LineNumberTable:
                line 10: 0
                line 12: 7
                line 13: 11
```

An example implementation of a Proxy Source Method is shown below (which references the example AddToCache Method shown above):

```
        public static String ProxySourceMethod( ServletRequest req,
String param )
        {
                // (1)   invoke the same or similar Source Method as
                //       was originally intended to be invoked by the
                //       application code, with the same or similar
                //       parameters that were originally intended to
                //       be used by the application in the Source Method
                //       invocation
                String inputValue = req.getParameter( param );
                // (2)   invoke the AddToCache Method with the Input
                //       Values, or a copy of the Input Values, returned by
                //       the invocation of the Source Method
                AddToCache( inputValue );
                // (4)   returns to the caller of the Proxy Source Method,
                //       the Input Values (or a copy of them) returned from
                //       the invocation of the Source Method.
                return inputValue;
        }
```

Preferably when implemented for the Java Platform, the AddToCache Method stores either the Input Value, or a copy of the Input Values, into the Tainted Value Cache as weak reference(s), by encapsulating the Input Values (or their copies) in a java.lang.ref.WeakReference object.

Any method in the Java API class libraries and the Java EE API class libraries may be designated as Source Methods in accordance with the preferred embodiment of this invention, and the techniques described herein will apply mutatis mutandis for all such alternative Source Methods.

Step 3—Sink Methods

In a third step, one or more Sink Methods are identified.

A Sink Method is a method which takes one or more parameters from the application code, where the action or effect of the Sink Methods being executed with parameters made up wholly or partially of one or more Input Values, may result in a security vulnerability, exploit, or breach if one or more of the Input Values contain illegal (or malicious or unsafe or unvalidated) data, commands, or characters.

In the Java Platform, one example Sink Method is the java.sql.Statement.execute(String) method (and similar methods of the java.sql.* package). This execute (String) method takes a String parameter representing an SQL query to be executed by a database, and which may contain one or more substring values which originated from a Source Method (i.e. Input Values) and which may represent a command-injection attack if allowed to execute unchecked and unblocked.

Sink Methods thus represent the exit-point for Input Values which have entered from an untrusted source or from outside of the application (such as a remote network host), and which therefore may represent an attempted attack or security breach on the application program. The danger of Sink Methods is that the parameters that they may receive, which may include Input Values either wholly or partially, may undertake confidential or sensitive operations or actions (such as on a database) which, when manipulated by an attacker to contain special character sequences or other undesirable data, may allow an attacker to insert commands into the Sink Method.

In accordance with Step 3, when an application program invokes a Sink Method, an IsTainted Method examines one or more of the parameters, or a copy of one or more of the parameters, in order to determine whether the parameters include one or more Input Values.

There are several ways in which the parameters to a Sink Method can be examined by an IsTainted Method to determine whether these parameters include, either wholly or partially, one or more Input Values.

In a first embodiment of Step 3, application source code is modified to invoke an IsTainted Method before the invocation of the Sink Method, where some or all of the parameters that will be passed to the Sink Method, or a copy of some or all of the parameters that will be passed to the Sink Method, are passed to the IsTainted Method, and where the IsTainted Method determines whether these parameters include data of one or more Input Values.

This first embodiment of Step 3 is desirable when modification of application source-code is possible and feasible.

In an alternative second embodiment, which does not require modification to application source-code, compiled application code (such as classfile bytecode in the Java Platform) is modified as it is loaded into the JVM, or executed by the JVM, to intercept calls to Sink Methods by:

1) searching for INVOKE instructions (for example invokestatic, invokevirtual, invokeinterface, invokespecial, invokedynamic) which reference a Sink Method which is sought to be intercepted, and 2) for each so-found INVOKE instruction, inserting an extra INVOKE instruction of an IsTainted Method to execute before the so-found INVOKE instruction, where the IsTainted Method is invoked with some or all of the parameters (or a copy of the them) that will be passed to the so-found INVOKE instruction, and 3) where the IsTainted Method examines these parameters in order to determine whether these parameters include data of one or more Input Values.

An example of a bytecode classfile being modified in accordance with this second embodiment is shown below:

```
                      BEFORE
public static void doSqlAction(java.sql.Statement, java.lang.String)
throws java.sql.SQLException;
          flags: ACC_PUBLIC, ACC_STATIC
          Code:
                stack=2, locals=2, args_size=2
                   0: aload_0
                   1: aload_1
                   2: invokeinterface #5, 2        // InterfaceMethod
java/sql/Statement.execute:(Ljava/lang/String;)Z
                   7: pop
                   8: return
                LineNumberTable:
                   line 19: 0
                   line 20: 8
          Exceptions:
                throws java.sql.SQLException
                       AFTER:
    public static void doSqlAction(java.sql.Statement, java.lang.String)
throws java.sql.SQLException;
          flags: ACC_PUBLIC, ACC_STATIC
          Code:
                stack=2, locals=2, args_size=2
                   0: aload_1
                   1: invokestatic #500            // Method
IsTainted:(Ljava/lang/String;)V
                   4: aload_0
                   5: aload_1
                   6: invokeinterface #5, 2        // InterfaceMethod
java/sql/Statement.execute:(Ljava/lang/String;)Z
                   11: pop
                   12: return
                LineNumberTable:
                   line 19: 0
                   line 20: 4
                   line 21: 12
          Exceptions:
                throws java.sql.SQLException
```

An example implementation of an IsTainted Method is shown below (which references the example IsSafe Method shown later):

```
// IsTainted Method examines the parameters in order
// to determine whether the parameters include,
// wholly or partially, one or more Input Values
// stored in the Tainted Value Cache
public static void IsTainted( String parameter )
{
    Iterator<WeakReference> iterator =
        TaintedValueCache.iterator( );
    // Determine whether the parameter to a Source Method
    // includes any data of an Input Value stored in
    // the Tainted Value Cache.
    while( iterator.hasNext( ) )
    {
        WeakReference encapsulatedInputValue =
            iterator.next( );
        String InputValue = ( String )
            encapsulatedInputValue.get( );
        if( InputValue != null )
        {
            if( parameter.contains( InputValue ) )
            {
                // We have determined that this is a
                // Tainted Parameter, so invoke the
                // IsSafe Method to determine whether
                // this parameter is, or may be, a
                // command-injection attack.
                IsSafe( parameter, InputValue );
            }
        }
        else
        {
            // Garbage collect (remove) this entry
            // from the Tainted Value Cache because
            // the garbage collector has reclaimed
            // the Input Value that this Weak Reference
            // encapsulated
            iterator.remove( );
        }
    }
}
```

In a third embodiment, which also does not require modification to application source-code, compiled application code (such as classfile bytecode in the Java Platform) is modified as it is loaded into the JVM, or executed by the JVM, to intercept calls to Sink Methods by:
1) searching for INVOKE instructions (for example invokestatic, invokevirtual, invokeinterface, invokespecial, invokedynamic) which reference a Sink Method which is sought to be intercepted, and
2) for each so-found INVOKE instruction, replacing the so-found instruction with a replacement INVOKE instruction that invokes a Proxy Sink Method which is provided for the purpose of intercepting and/or emulating access to the Sink Method A Proxy Sink Method is then provided, where the Proxy Sink Method receives some or all of the parameters originally intended to be passed to the Sink Method and:
1) invokes an IsTainted Method, before invocation of the Sink Method, with some or all of the parameters, or a copy of some or all of the parameters, that are intended to be passed to the Sink Method, and
2) where the IsTainted Method examines the parameters in order to determine whether the parameters include, wholly or partially, one or more Input Values, and
3) invokes the same or similar Sink Method as was originally intended to be invoked by the application code, with the same or similar parameters that were originally intended to be invoked by the application and which have been passed to the Proxy Sink Method.
4) returns to the caller of the Proxy Sink Method, the return values (if any) returned from the invocation of the Sink Method by the Proxy Sink Method.

An example of the third embodiment is shown below, with a before and after of a bytecode classfile modified in accordance with the above steps:

```
                BEFORE
public static void doSqlAction(java.sql.Statement, java.lang.String)
throws java.sql.SQLException;
        flags: ACC_PUBLIC, ACC_STATIC
        Code:
            stack=2, locals=2, args_size=2
                0: aload_0
                1: aload_1
                2: invokeinterface #5, 2         // InterfaceMethod
java/sql/Statement.execute:(Ljava/lang/String;)Z
                7: pop
                8: return
        LineNumberTable:
            line 19: 0
            line 20: 8
        Exceptions:
            throws java.sql.SQLException
                AFTER:
    public static void doSqlAction(java.sql.Statement, java.lang.String)
throws java.sql.SQLException;
        flags: ACC_PUBLIC, ACC_STATIC
        Code:
            stack=2, locals=2, args_size=2
                0: aload_0
                1: aload_1
                2: invokestatic #500              // Method
ProxySinkMethod:(Ljava/sql/Statement;Ljava/lang/String;)Z
                5: pop
                6: return
        LineNumberTable:
            line 21: 0
            line 22: 6
        Exceptions:
            throws java.sql.SQLException
```

An example implementation of a Proxy Sink Method is shown below (which references the example IsTainted Method shown above):

```
public static boolean ProxySinkMethod( java.sql.Statement statement,
String parameter )
    throws java.sql.SQLException
    {
        // (1)       invoke the IsTainted Method, before
        //           invocation of the Sink Method, with
        //           some or all of the parameters, or a
        //           copy of some or all of the parameters,
        //           that are intended to be passed to the
        //           Sink Method
        IsTainted( parameter );
        // (3)       invoke the same or similar Sink Method
        //           as was originally intended to be invoked
        //           by the application code, with the same
        //           or similar parameters that were originally
        //           intended to be invoked by the application
        //           and which have been passed to the Proxy
        //           Sink Method.
        boolean result = statement.execute( parameter );
        // (4)       return to the caller of the Proxy Sink
        //           Method, the return values (if any) returned
        //           from the invocation of the Sink Method
        return result;
    }
```

Step 4—IsTainted Method

In a fourth step, an IsTainted Method is provided which receives one or more parameters intended for a Sink Method (or a copy of them), and which examines these parameters in order to determine if data of one or more Input Values stored in the Tainted Value Cache are included in these parameters.

The purpose of the IsTainted Method(s) is to determine whether the parameters to a potentially sensitive or vulnerable Sink Method include Input Values that have originated from an untrusted source or from outside the application program.

The IsTainted Method for making such a determination may use different examination and determination means. For example in the Java Platform, if the parameters to a Sink Method are of the type java.lang.String, and/or one or more of the Input Values are of type java.lang.String, then the IsTainted Method can check for inclusion of one or more Input Values stored in the Tainted Value Cache as substrings within these parameters by using the java.lang.String.contains(String) method. An example of an IsTainted Method has been shown in the above description. Other string examination methods may also be used (for example the java.lang.String.regionMatches( ) methods) which provide special handling for string case, such as performing case-insensitive string region matching.

Different parameter types, and different Input Value types, generally require different examination and determination means in the IsTainted Method, which will be known to those skilled in the computing arts, and which will apply mutatis mutandis with the description herein. Regardless of the exact determination means used, what is important is that a determination is made, or is able to be made, that one or more parameters to a Sink Method contains data of one or more Input Values.

When the IsTainted Method has examined all relevant parameters and determined that these parameters do not include, wholly or partially, any data of one or more Input Values stored in the Tainted Value Cache, then the IsTainted Method completes execution and returns back to the method (application) which called it, so that the caller method (application) is able to proceed normally with its execution thereafter.

However, when the IsTainted Method determines that one or more parameters includes, wholly or partially, data of one or more Input Values stored in the Tainted Value Cache, then the IsTainted Method proceeds to the IsSafe Method of Step 5 to resolve whether the included data of one or more Input Values is safe for inclusion in said parameter, or not. Such a parameter intended for a Sink Method which includes, wholly or partially, one or more Input Values stored in the Tainted Value Cache, is described as a Tainted Parameter.

Many methods in the Java API class libraries, or the Java EE API class libraries, may be designated as Sink Methods in accordance with the preferred embodiment of this invention, and the techniques described herein will apply mutatis mutandis for all such alternative Sink Methods. Examples of such Sink Methods include java.sql.Statement.execute (String sql), java.sql.Statement.execute(String sql, int auto-GeneratedKeys), java.sql.Statement.execute(String sql, int[ ] columnIndexes), java.sql.Statement.execute(String sql, String[ ] columnNames), java.sql.Statement.executeQuery(String sql), java.sql.Statement.executeUpdate(String sql), java.sql.Statement.executeUpdate(String sql, int auto-GeneratedKeys), java.sql.Statement.executeUpdate(String sql, int[ ] columnIndexes), java.sql.Statement.executeUpdate(String sql, String[ ] columnNames), java.sql.Connection.prepareCall(String sql), java.sql.Connection.prepareCall(String sql, int resultSetType, int resultSetConcurrency), and java.sql.Connection.prepareCall(String sql, int resultSetType, int resultSetConcurrency, int resultSetHoldability).

Step 5—IsSafe Method

In a fifth step, an IsSafe Method is provided which makes a determination whether a Tainted Parameter, which includes the data of one or more Input Values stored in the Tainted Value Cache, represents or may represent a command-injection attack.

In order for the IsSafe Method to make such a determination, it examines any one, or a combination, of
   (i) the data of each Input Value included in the Tainted Parameter,
   (ii) the placement of the data of each Input Value included in the Tainted Parameter, and/or
   (iii) the data before or after each included Input Value in the Tainted Parameter.

In embodiments where a Tainted Parameter is of type java.lang.String (such as is the case for the java.sql.Statement.execute(String) Sink Method), and/or one or more of the included Input Values are of type java.lang.String, then a determination whether the Tainted Parameter can represent a command-injection attack may be made by examining each Input Value substring included in the Tainted Parameter for the presence of, or absence of, specific combinations of special characters or escape characters or non-alphanumeric characters. An example list of special characters, escape characters, or non-alphanumeric characters includes single quotes ("'"), double quotes (" ""), spaces (" "), slashes ("/", "\"), brackets ("(", ")", "{","}", "]", "[", "<", ">"), and other non-letter and non-number characters (e.g. "$", "%", "*", "=", ".", ";", ",", ",").

The list of special characters, escape characters, or non-alphanumeric characters that are desirable to check for the presence of, or absence of, will in part be determined by the nature of the Sink Method and the expected data format that the Sink Method expects of the parameters passed to it. When the Sink Method is SQL related, then the list of special/escape/non-alphanumeric characters can be database specific, and can be determined or specified by an administrative setting or rule file provided for that purpose.

For example, in the Java Platform, an IsSafe Method for a SQL query (such as for the Sink Method java.sql.Statement.execute(String)) checks for the presence of database-specific special character sequences within each of the Input Value(s) included in the Tainted Parameter, and for each so-found special character, checks whether the special character is preceded by a database-specific escape character, if every so-found special character is not preceded by an appropriate database-specific escape character, then a determination is made that the Tainted Parameter represents a command-injection attack.

In another example in the Java Platform, an IsSafe Method for a SQL query (such as for the Sink Method java.sql.Statement.execute(String)) checks for the presence of single quote, or double quote, characters before and after the Input Value substring(s) included in the Tainted Parameter. If a single quote or double quote character is not found before and after one of the Input Value substrings, then the method checks fir the presence of a space character in that Input Value substring. If a space character is found, then a determination is made that the Tainted Parameter represents a command-injection attack.

A source-code sample of this simplified example is shown below:

```
// IsSafe Method makes a determination whether a
   // Tainted Parameter, which includes data of one
```

```
    // or more Input Values stored in the Tainted
    // Value Cache, represents or may represent a
    // command-injection attack
    public static void IsSafe( String TaintedParameter, String InputValue
)
    throws java.lang.SecurityException
    {
        int offset = TaintedParameter.indexOf( InputValue );
        int length = InputValue.length( );
        // check for the absence of a double quote
        // before and after the Input Value substring
        if( TaintedParameter.charAt( offset − 1 ) != '\"'
            && TaintedParameter.charAt( offset + length ) != '\"' )
        {
            // double quotes are absent from before
            // and after the Input Value substring,
            // so check if a space character is found
            // in the InputValue substring
            if( InputValue.contains( " " ) )
            {
                // Input Value substring contains a
                // space character, but before and
                // after the Input Value substring
                // double quotes are absent, so
                // we have determined that this is a
                // command-injection attack and will
                // optionally apply a Security
                // Action
                SecurityAction( TaintedParameter );
            }
        }
    }
}
```

Different parameter types, and different Input Value types, may require different determination means in the IsSafe Method, which will now be apparent to those in the computing arts, and which will apply mutatis mutandis to the description herein. Regardless of the exact determination means used, what is important is that a determination is made, or is able to be made, that a Tainted Parameter represents, or may represent, a command injection attack.

One or more IsSafe Methods can be provided simultaneously in an implementation of the preferred embodiment of this invention. In preferred arrangements, it is advantageous to provide one IsSafe Method per Sink Method, with the determination means of each IsSafe Method selected for the Sink Method's parameter types that the IsSafe Method corresponds to.

Optional Step 6—Security Action

Once an IsSafe Method has determined that a Tainted Parameter may represent a command-injection attack, a Security Action can be undertaken to:
  (i) record to a security log file provided for that purpose, the attempt to invoke a Sink Method with a Tainted Parameter, and/or
  (ii) deny or block the invocation of the Sink Method with the Tainted Parameter.

Examples of some Security Actions include throwing java.lang.Throwable, java.lang.Exception, java.lang.Error, or subclasses of these classes, in order to interrupt execution of the application program and thereby block the application code (or the Proxy Sink Method) from invoking the Sink Method with the Tainted Parameter(s).

Other Security Actions that ensure a Sink Method is not invoked with a Tainted Parameter include shutting down the application and/or JVM, suspending the threads of the application, or stopping or destroying the executing thread of the application program on which the Sink Method was to be executed.

In other arrangements, it is preferable for the Security Actions to permit the Sink Method to be invoked with the Tainted Parameters, but record to a security log file provided for that purpose, the fact and details of the Sink Method being invoked with Tainted Parameter(s).

An illustrative example of a Security Action Method, invoked by the IsSafe Method example above, is shown below:

```
    private static Boolean ruleFileIsConfiguredToDeny = true;
    public static void SecurityAction( String TaintedParameter )
    throws java.lang.SecurityException
    {
        // (i)        record to a security log file provided
        //            for that purpose, the attempt to invoke
        //            a Sink Method with a Tainted Parameter.
        logSecurityAction( "An unsafe operation was attempted
    with TaintedParameter="
            + TaintedParameter );
        if( ruleFileIsConfiguredToDeny )
        {
            // (ii)       deny or block the invocation of the Sink
            //            Method with the Tainted Parameter
            throw new java.lang.SecurityException( "This
    operation is denied" );
        }
    }
```

A wide range of Security Actions can be used with this invention, mutatis mutandis, and these will now be apparent to those skilled in the computing arts.

Preferably, the Security Action to undertake is specified by means of a human-readable "rules file" stored on a hard disk or equivalent storage means, which specifies action to undertake in the event of a Sink Method being invoked with Tainted Parameter(s).

An example of such a rule file, specifying actions or operations to deny, is shown below:

```
    # SQL rule for denying SQL command-injection
    sql:database:oracle:deny:warn
```

In an optional further step, in addition to enforcing security constraints, or as an alternative to it, logging to a security log file maintained by the Security Action Method for that purpose can be performed. The log records the Sink Method(s) attempted to be invoked with Tainted Parameters.

In this way, alert notices of suspicious or malicious operations attempted to be performed upon Sink Methods can be logged and examined at a later time by the administrator to determine whether the actions performed are indeed suspicious or malicious, or not. This log file can then be used to audit application behaviour, to thereby gain valuable intelligence on vulnerabilities, exploits, and attack stratagems of the executing application.

Preferably, the suspicious or potentially malicious actions or operations desirable to be logged to the security log file are specified by means of a human-readable "rules file" stored on a hard disk or equivalent storage means, which specifies the actions that the IsSafe, IsTainted, or Proxy Sink Methods should allow or deny, but to also log an alert or other notice of such action/operation occurring to the security log file provided for that purpose.

An example of such a rule file, specifying actions or operations to log the occurrence of, is shown below:

```
    # SQL rule for denying SQL command-injection
    sql:database:oracle:allow:warn
```

Preferably, when these techniques are directed, wholly or partially, towards mitigating SQL command-injection attacks against SQL Sink Methods like java.sql.Statement.execute(String), a rule format is provided for specifying the Security Action to be applied in such attacks, where the rule format includes a parameter or data value which identifies the make and model of the database that an application is using. When such a preferred rule format as this is used, the Step 5 IsSafe Method can use the database make and model identifier provided in the rules file to choose the appropriate special/escape/non-alphanumeric character set for the identified database.

In alternative embodiments of this invention, Step 5 is omitted, and at Step 4 the Security Action of Optional Step 6 is applied when one or more parameters are designated as a Tainted Parameter.

The description herein, specifically of the AddToCache Method, IsTainted Method, and IsSafe Method, is not intended to be exhaustive of every embodiment. To those skilled in the computing arts, it will now be apparent that the Steps of this invention, and/or the Methods described in those Steps, can be combined, or re-arranged, or divided in various combinations without departing from the scope of the present invention.

In alternative embodiments of the described java.lang.String comparisons between parameters, Tainted Parameters, and Input Values, it is desirable that such String comparison operations (such as java.lang.String.contains(String)) are operated in a case-insensitive way, or by using case-insensitive String comparator methods provided for that purpose.

An example list of possible Sink Methods for the Java API classlibraries and the Java EE API classes, is:

```
java.sql.Statement.execute(String sql)
java.sql.Statement.execute(String sql, int autoGeneratedKeys)
java.sql.Statement.execute(String sql, int[ ] columnIndexes)
java.sql.Statement.execute(String sql, String[ ] columnNames)
java.sql.Statement.executeQuery(String sql)
java.sql.Statement.executeUpdate(String sql)
java.sql.Statement.executeUpdate(String sql, int autoGeneratedKeys)
java.sql.Statement.executeUpdate(String sql, int[ ] columnIndexes)
java.sql.Statement.executeUpdate(String sql, String[ ] columnNames)
java.sql.Connection.prepareCall(String sql)
java.sql.Connection.prepareCall(String sql, int resultSetType, int
resultSetConcurrency)
java.sql.Connection.prepareCall(String sql, int resultSetType, int
resultSetConcurrency, int resultSetHoldability)
java.sql.Connection.prepareStatement(String sql)
java.sql.Connection.prepareStatement(String sql, int
autoGeneratedKeys)
java.sql.Connection.prepareStatement(String sql, int[ ]
columnIndexes)
java.sql.Connection.prepareStatement(String sql, int resultSetType,
int resultSetConcurrency)
java.sql.Connection.prepareStatement(String sql, int resultSetType,
int resultSetConcurrency, int resultSetHoldability)
java.sql.Connection.prepareStatement(String sql, String[ ]
columnNames)
java.lang.Class.getField(String)
java.lang.Class.getDeclaredField(String)
java.lang.Class.getConstructor(Class[ ])
java.lang.Class.getDeclaredConstructor(Class[ ])
java.lang.Class.getMethod(String,Class[ ])
java.lang.Class.getDeclaredMethod(String,Class[ ])
java.lang.reflect.Method.invoke(Object,Object[ ])
java.lang.reflect.Constructor.newInstance(Object[ ])
java.lang.reflect.Field.set(Object,Object)
java.lang.reflect.Field.get(Object)
java.lang.Runtime.exec(String)
java.lang.Runtime.exec(String,String[ ])
java.lang.Runtime.exec(String,String[ ],File)
java.lang.Runtime.exec(String[ ])
java.lang.Runtime.exec(String[ ],String[ ])
java.lang.Runtime.exec(String[ ],String[ ],File)
java.lang.Runtime.load(String)
java.lang.Runtime.loadLibrary(String)
java.lang.System.load(String)
java.lang.System.loadLibrary(String)
java.lang.ProcessBuilder.<init>(String)
java.lang.ProcessBuilder.<init>(List<String>)
java.io.File.<init>(String)
java.io.FileInputStream.<init>(String)
java.io.FileOutputStream.<init>(String)
java.io.RandomAccessFile.<init>(String,String)
java.net.Socket.<init>(String,int)
java.beans.Expression.<init>(Object,Object,String,Object[ ])
java.beans.Expression.<init>(Object,String,Object[ ])
java.beans.Statement.<init>(Object,String,Object[ ])
javax.el.ELResolver.invoke(ELContext,Object,Object,Class[ ],Object[ ])
javax.el.ExpressionFactory.createMethodExpression(ELContext,String,C
lass,Class[ ])
javax.el.ExpressionFactory.createValueExpression(ELContext,String,Cl
```

-continued

```
ass)
javax.el.ExpressionFactory.createValueExpression(Object,Class)
```

Those skilled in the computing arts will now be aware of further possible Sink Methods beyond the list above.

An example list of possible Source Methods for the Java API classlibraries and the Java EE API classes, is:

```
javax.servlet.ServletRequest.getParameter(String)
javax.servlet.ServletRequest.getAttribute(String)
javax.servlet.ServletRequest.getParameterMap( )
javax.servlet.ServletRequest.getParameterValues(String)
javax.servlet.http.HttpServletRequest.getHeader(String)
javax.servlet.http.HttpServletRequest.getHeaders(String)
javax.servlet.http.HttpSession.getAttribute(String)
javax.servlet.http.HttpSession.getValue(String)
javax.servlet.http.Cookie.getValue( )
javax.servlet.http.Cookie.getPath( )
javax.servlet.http.Cookie.getName( )
javax.servlet.http.Cookie.getDomain( )
javax.servlet.http.Cookie.getComment( )
javax.servlet.http.Part.getHeader(String)
javax.servlet.http.Part.getHeaders(String)
```

Those skilled in the computing arts will now be aware of further possible Source Methods beyond the list above.

The above-mentioned IsTaintedMethod, ProxySinkMethod, ProxySourceMethod, IsSafeMethod, AddToCacheMethod, and SecurityActionMethod are all new to the JAVA language.

The foregoing describes only some embodiments of the present invention and modifications, obvious to those skilled in the computing arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A method of enhancing command injection protection to achieve improved operation of a computer which receives input data from an untrusted source, and which operates an application program which utilizes said input data, said method comprising the steps of:

creating a garbage-collected tainted value cache as a location in which the input data from the untrusted source is stored, performing a data characterization test on the input data, wherein said data characterization test comprises a data characterization test to see when said input data comprises only numerical data or only alphabetical data, storing said input data in said garbage-collected tainted value cache to create stored data when said input data did not pass the data characterization test, and not storing the passed input data in said garbage-collected tainted value cache, intercepting said stored data, when said application program invokes a method which utilizes said stored data, before said stored data is utilized by said application program, creating intercepted data and subjecting the intercepted data to a data content test, wherein said data content test comprises searching for code indicating characters, said code indicating characters being permissible characters other than alpha-numeric characters, forwarding said intercepted data to said application program for utilization when said intercepted data passes said data content test, and implementing a security action when said intercepted data fails said data content test, wherein said security action is selected from the class of security actions consisting of making a log entry, blocking execution of said application program, and shutting down said computer.

2. The method as defined in claim 1 wherein a weak reference encapsulating each input value is stored in said garbage-collected tainted value cache, and said weak references are stored in a weak reference queue.

3. The method as defined in claim 2 wherein weak references corresponding to data deleted from said garbage-collected tainted value cache are also deleted from said weak reference queue.

4. The method as defined in claim 1 wherein when said application program invokes a source method, the values returned to said source method are stored in said garbage-collected tainted value cache.

* * * * *